Nov. 20, 1928.
F. M. POTTER
1,692,798
CONDUIT COUPLING
Filed Aug. 19, 1925
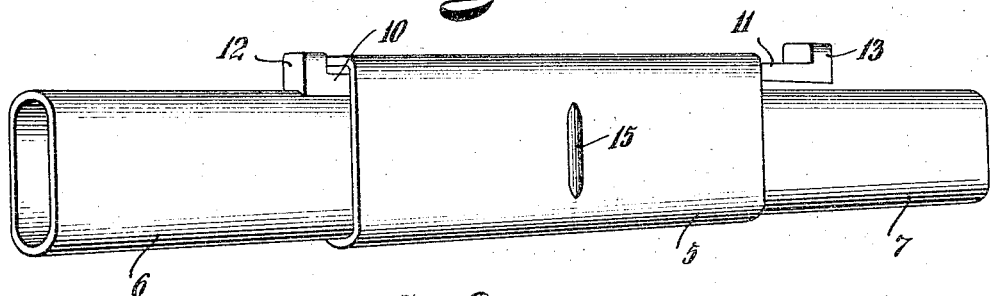
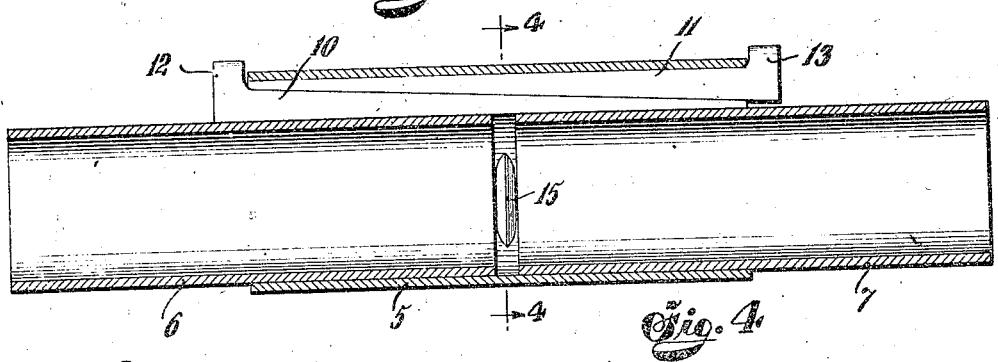
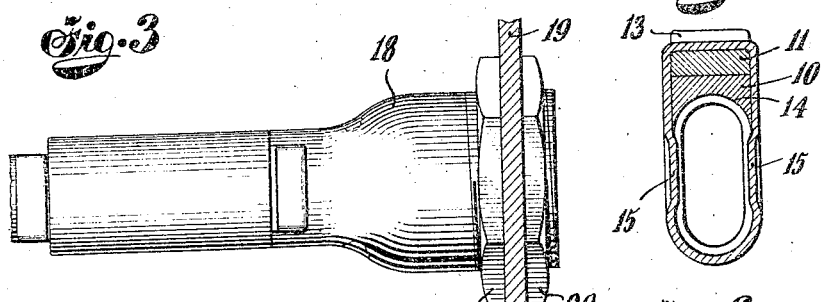
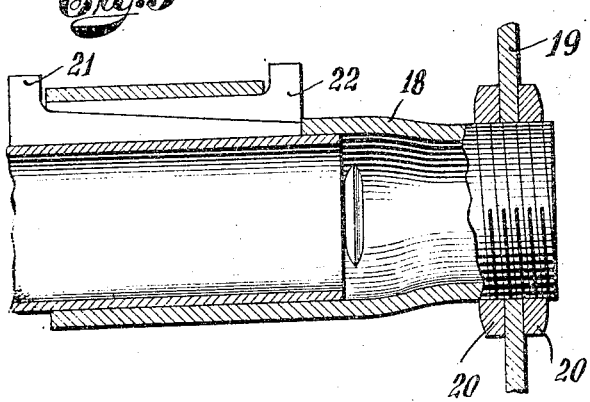
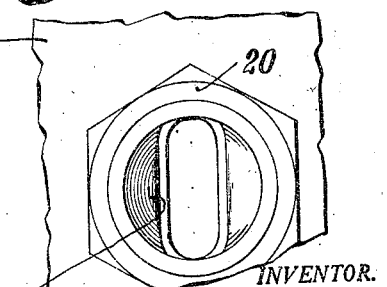
INVENTOR.
Frank M. Potter
BY
Emery Booth Janney & Varney
ATTORNEYS.

Patented Nov. 20, 1928.

1,692,798

UNITED STATES PATENT OFFICE.

FRANK M. POTTER, OF ROME, NEW YORK, ASSIGNOR TO GENERAL CABLE CORPORATION, OF NEW YORK, N. Y., A CORPORATION OF NEW JERSEY.

CONDUIT COUPLING.

Application filed August 19, 1925. Serial No. 51,155.

The present invention relates to improved means for connecting pipe sections.

In the installation of electrical wires and cables, the method of installation usually considered to be the best involves the use of a metal raceway in which the insulated wires or cables are placed. This metal raceway may take several forms of which one is a rigid pipe or conduit as distinguished from flexible conduit or armored cable. This so-called rigid conduit generally consists of a suitably coated round pipe of sufficient wall thickness so that pipe threads may be turned on the ends of the sections and an ordinary screw coupling used to connect one section with another. The connection between adjacent sections must afford a good electrical bond as well as a good mechanical connection because the conduit in addition to its function of protecting the enclosed wires from mechanical injury, is also intended to serve as a ground connection to effectively ground fixtures and ground any wire having defective insulation.

By far the largest quantity of rigid conduit for electrical purposes is used in buildings where it forms a continuous housing for the electrical wires or cables which supply energy for lighting or power purposes. There are many structures wherein the installation of a round pipe of the necessary diameter is attendant with considerable inconvenience because of the space required and it would therefore be advantageous to use an out of round pipe or conduit having the minimum internal cross-sectional area to take the necessary number of conductors lying side by side. Obviously, the ordinary screw coupling cannot be used with out of round conduit. Moreover, it would be desirable from the point of view of economy to use a conduit having a relatively thin wall, that is, a wall of insufficient thickness to take the ordinary pipe threads without unduly weakening it.

With these considerations in mind, the connecting means of the present invention has been provided; the object being to make available a form of coupling which is adapted to be used with rigid conduit in cases where, for one reason or another, the usual screw threaded coupling cannot be used and at the same time providing a coupling which will undoubtedly prove more economical in construction and installation.

A preferred embodiment of the invention is shown in the accompanying drawings wherein:—

Figure 1 is a perspective view of a coupler connecting two opposed ends of similar conduit sections;

Figure 2 is a central sectional view of the same;

Figure 3 is a top plan view of an outlet box connection;

Figure 4 is a transverse sectional view taken on the line 4—4 of Figure 2; and

Figures 5 and 6 are respectively sectional and end views of the outlet box connection.

In the particular structure shown for the purpose of illustrating the invention, a sleeve 5 frictionally engages the opposed ends of sections 6, 7 of thin walled out of round conduit of a type which may be used to enclose electrical conductors. This conduit will be described for convenience as elliptical, the term being used in a broad sense to define a conduit of generally flattened cross-section rather than one of circular cross-section.

In order to secure the conduit sections within the sleeve, wedge means are provided to tightly clamp each section in adjusted position and to this end the sleeve is made larger than the conduit sections in order to leave space for the wedging devices. As shown, the shorter diameter of the sleeve is such that it substantially fits the conduit sections and the longer diameter is sufficiently greater than that of the conduit sections to provide space for opposed wedges 10, 11 having heads 12 and 13 which extend beyond the ends of the sleeve and laterally outward from the conduit to facilitate manipulation thereof to either tighten the wedges within the sleeve or to loosen the same to permit disconnection of the conduit sections if desired. The inner wedge 10 is grooved on its inner face as indicated at 14 to fit the edges of the conduit sections in order to avoid any tendency to crush the same. The outer wedge 11 has an inner plane surface engaging the outer plane surface of the wedge 10 and an outer surface shaped to fit the interior surface of the sleeve as indicated in Figure 4. In Figure 1 the wedges are shown as inserted part way and in Figure 2 they are shown as forced all the way in to secure the conduit ends. The sleeve is preferably provided at its center with inwardly projecting ribs 15, 15 at either side to limit the position of the conduit ends inserted therein.

The connection shown is of such a character that it can be economically and expeditiously manufactured and in use it can be quickly and easily applied to connect the conduit sections without requiring the use of special tools. The joint is tight so that the fire hazard is reduced to a minimum and the electrical bond afforded by this connection is exceedingly good because of the sliding of the parts relatively to each other under pressure as the joint is formed. This action has a tendency to remove any particles of foreign matters which may be on the cooperating surfaces and to bring the same into intimate contact. Preferably the parts and particularly the conduit and sleeve are protected as by galvanizing. The connection when made up is neat in appearance and takes up very little more space than the conduit itself, which is important in the first instance where the conduit is exposed and in the second when it is placed where there is very little room as on the surface of hollow tile walls which are to be plastered. The mechanical bond afforded is entirely sufficient in all usual circumstances.

Any suitable coupling may be provided for connecting the end of a conduit to the outlet box. A convenient arrangement is illustrated in Figures 3, 5 and 6. As there shown a coupling member 18 is formed at one end to fit in the usual knockout hole of an outlet box 19, nuts 20 being provided on the free end thereof to hold this member in position. The outer free end of the coupling member 18 is formed to have substantially the same cross-sectional shape as the coupling member 5 shown in Figures 1, 2 and 3 and wedges 21 and 22 which are substantially similar to the wedges 11 and 12 although shorter are provided for clamping the conduit end in position in the sleeve.

The description of the particular embodiment is illustrative merely and is not intended as defining the limits of the invention, and the invention may be variously modified and embodied within the scope of the subjoined claims.

What I claim as my invention:

1. A coupler for elliptical conduits comprising in combination a sleeve substantially elliptical in cross-section, its smaller diameter being substantially that of the conduit sections to be connected and its larger diameter being greater than the larger diameter of the conduit ends, opposed wedges superposed within said sleeve and each extending from end to end thereof, the inner wedge substantially fitting the edge of the conduit section, the outer wedge substantially fitting the sleeve, whereby movement of said wedges upon each other in opposite directions will cause said sleeve to firmly engage substantially the entire enclosed surface of the conduit sections.

2. A coupler for conduits comprising in combination, a sleeve embracing the adjacent ends of the conduit sections and opposed wedges superposed within said sleeve and each extending from end to end thereof, the inner wedge substantially fitting the surface of the conduit and the outer wedge fitting the inner surface of the sleeve whereby movement of said wedges upon each other in opposite directions will cause said sleeve to firmly engage substantially the entire surface of the conduit sections from end to end of the sleeve.

In testimony whereof, I have signed my name to this specification this seventeenth day of August, 1925.

FRANK M. POTTER.